(12) United States Patent
Schilling et al.

(10) Patent No.: US 6,314,728 B1
(45) Date of Patent: Nov. 13, 2001

(54) HYDRAULIC DOOR OPERATOR

(75) Inventors: Ronald A. Schilling, New Berlin; Harry C. Evans, Oconomowoc, both of WI (US)

(73) Assignee: ASI Technologies, Inc., Milwaukee, WI (US)

( * ) Notice: Subject to any disclaimer, the term of this patent is extended or adjusted under 35 U.S.C. 154(b) by 0 days.

(21) Appl. No.: 09/335,952

(22) Filed: Jun. 18, 1999

(51) Int. Cl.[7] .................................................. F16D 31/02
(52) U.S. Cl. ................................ 60/436; 60/494; 91/44
(58) Field of Search ............................... 91/44; 60/436, 60/442, 494

(56) References Cited

U.S. PATENT DOCUMENTS

| 4,296,570 | 10/1981 | Balbach et al. | 49/360 |
| 4,941,320 | * 7/1990 | Kersten et al. | 60/437 |
| 5,410,842 | * 5/1995 | Watson | 49/360 |
| 5,771,636 | * 6/1998 | Mathis | 49/139 |

* cited by examiner

Primary Examiner—Edward K. Look
Assistant Examiner—Thomas E. Lazo
(74) Attorney, Agent, or Firm—Quarles & Brady LLP

(57) ABSTRACT

A hydraulic door opener provides a simplified mechanism for two-speed operation and for controlling the release of a brake that normally holds the door against movement. The mechanism includes a bypass valve between a fluid reservoir feeding the pump and the close control line running between the pump and the hydraulic motor. Fluid flow is directed from the close control line so that the door can be closed at slower rate than it is opened using a single speed motor. A brake control valve releases the brake when the control lines are pressurized.

6 Claims, 1 Drawing Sheet

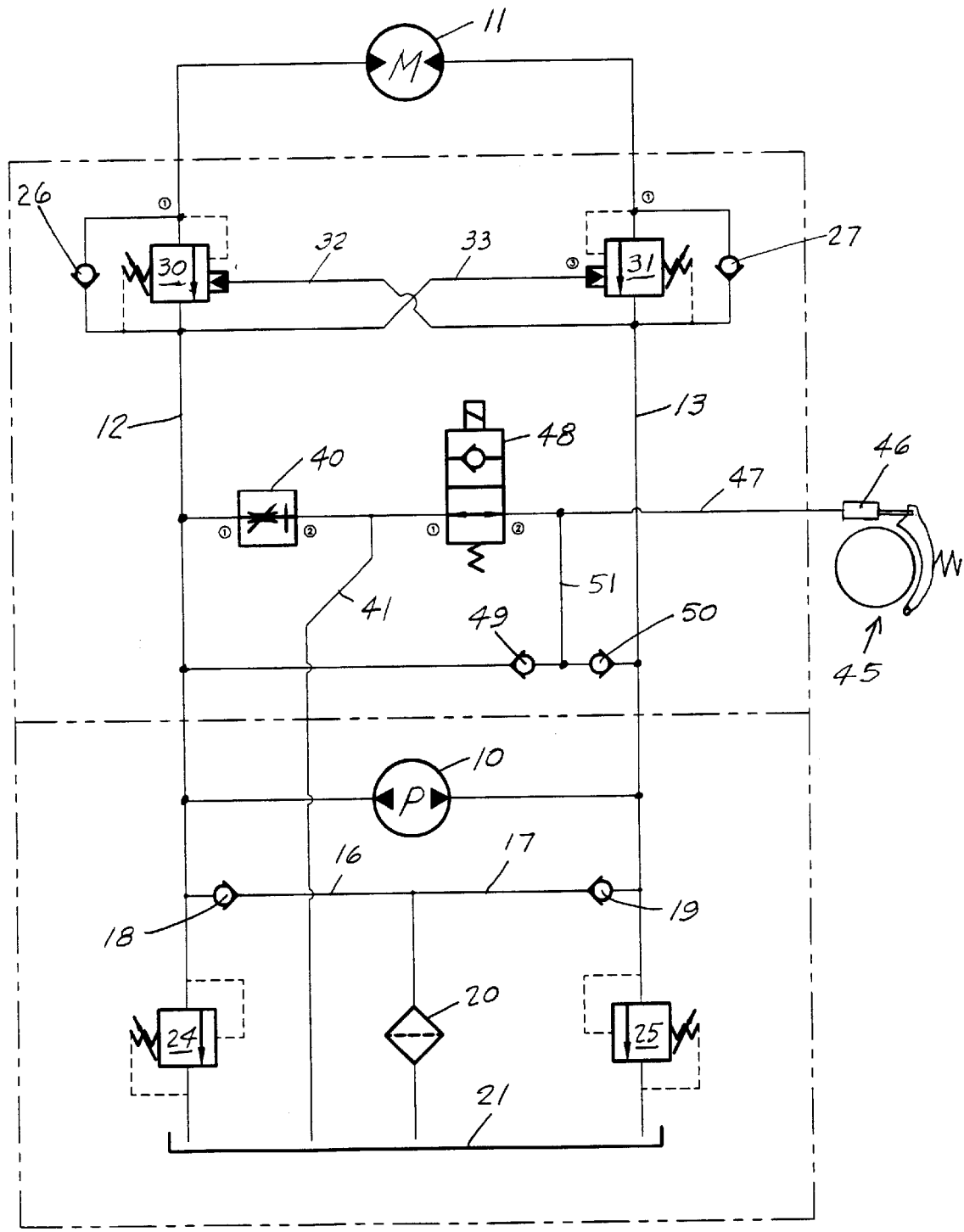

HYDRAULIC DOOR OPERATOR

BACKGROUND OF THE INVENTION

This invention relates to industrial door operators, and particularly to a hydraulic control system for the door operator which provides for different speeds in opening and closing the door and provides for the engagement and disengagement of a brake that holds the door against unwanted movement.

Door operators are used to open and close doors that are mounted for swinging or sliding movement between open and closed positions, or for doors that are mounted to unroll and roll up for closing and opening door openings. The industrial doors may be used for a variety of purposes such as closing the entry ways to cold storage environments. The industrial doors are typically driven between open and close positions by a reversible motor connected to a door drive mechanism.

Hydraulic systems for door operators have been proposed. Examples of hydraulic door operators are found in U.S. Pat. No. 4,296,570 issued Oct. 27, 1981 to George C. Balbach, et. al. and assigned to the assignee of this invention. In such hydraulic systems, a reversible hydraulic pump driven by an electric motor is connected by a closed loop to a reversible hydraulic motor which in turn drives the mechanical drive for the door.

The speed of operation of the door is important. When the doors are used in a cold storage environment, they should be kept open for the shortest possible duration consistent with safety. Typically, the door will be driven open at a very rapid speed and will be closed at a second, slower speed to ensure pedestrian and vehicle clearance through the door opening before closing occurs. U.S. Pat. No. 5,410,842 issued May 2, 1995 to Joel W. Watson, and assigned to the assignee of this invention, discloses a two-speed hydraulic door operator in which the speed of closing the door is slower than that of opening the door. This is accomplished by the use of a bypass valve assembly connected between the pump and hydraulic motor and operative to bypass a portion of the fluid flow from the pump to the motor when the pump is driving the motor to close the door. The bypass flow is returned to the pump. The bypass valve is disconnected from operation by a check valve when fluid flows from the pump to the hydraulic motor in a direction to drive the motor to open the door so that full fluid flow is directed to the motor during opening. This approach allows the use of an inexpensive single speed electric motor for two-speed operations and eliminates the need for a restrictive orifice in a connection between the pump and the motor which can generate heat.

The present invention is directed to a simplified two-speed hydraulic control system that also controls the disengagement of a brake that normally holds the door against movement.

SUMMARY OF THE INVENTION

According to the invention, a flow control valve is connected between one hydraulic control line leading from the reversible pump to the reversible motor connected to the door. The flow control valve leads to the hydraulic fluid reservoir that feeds the pump. A hydraulic control line leads from each side of the pump to a corresponding side of the motor and each hydraulic control line includes a counter balance valve piloted by pressure from the other control line. The flow control valve is connected to the one hydraulic control line at a point between the pump and the counter balance valve. Preferably, the flow control valve is a pressure compensated, adjustable flow control valve.

Further in accordance with the invention, an actuatable valve is disposed between the source of fluid pressure for a hydraulically releasable brake and the fluid reservoir. The actuatable valve normally connects the hydraulic release mechanism for the brake to the reservoir but is actuated to block the connection thereby providing fluid flow from either one of the hydraulic control lines to release the brake. Preferably, the actuatable valve is a poppet-style solenoid valve.

It is a principal object of the invention to provide a simplified mechanism for a two-speed operation of a hydraulic door operator.

It is also an object to provide a hydraulic door operator including a simple mechanism for controlling the release of a brake normally holding the door against movement.

The foregoing and other objects and advantages of the invention will appear in the detailed description which follows. In the description, reference is made to the accompanying drawing which illustrates a preferred embodiment of the invention.

BRIEF DESCRIPTION OF THE DRAWING

The sole FIGURE of the drawing is a schematic diagram of a hydraulic door operator circuit according to the present invention.

DETAILED DESCRIPTION OF THE PREFERRED EMBODIMENT

Referring to the drawing, a reversible hydraulic pump 10 is connected to a reversible hydraulic motor 11 by a pair of control lines 12 and 13. The pump 10 is typically driven by a electric motor (not shown) controlled by an electric control circuit of the type shown in U.S. Pat. No. 4,296,570. The two sides of the pump 10 are connected to input lines 16 and 17 containing check valves 18 and 19. The input lines 16 and 17 lead through a filter 20 to a hydraulic fluid reservoir or tank 21.

Pressure relief valves 24 and 25 are connected to the control lines 12 and 13, respectively. If hydraulic pressure is greater than a predetermined value in either of the control lines 12 or 13, the associated valve 24 or 25 opens to relieve pressure in the control line and bypasses fluid to the reservoir 21.

A pair of check valves 26 and 27 are disposed in the control lines 12 and 13, respectively. These check valves 26 and 27 permit hydraulic fluid to pass from the pump 10 to the motor 11, but not in the reverse direction. Also disposed in the control lines 12 and 13 are a pair of counter balance valves 30 and 31. These counter balance valves are disposed in parallel with the check valves 26 and 27. Each of the counter balance valves 30 and 31 is a combination relief and check valve. Each of the counter balance valves 30 and 31 responds to pressure in its own control line 12 or 13. It also responds to pressure from the other control line through pilot lines 32 and 33. Each of the counter balancing valves 30 and 31 act as a relief valve by sensing the high pressure in its respective control line when the pump 10 is supplying hydraulic fluid under pressure to rotate the motor 11 through that line. The counter balance valves 30 and 31 are normally closed. The respective counter balance valve 30 or 31 opens to permit the fluid to return from the motor 11 to the pump 10 when it senses high pressure in an opposite control line through the pilot line 32 or 33. The counter balance valves 30 and 31 also provide smooth stopping of the door by sensing high pressure in its control line resulting from the hydraulic motor 11 continuing to turn for a short time after the pump 10 is stopped.

What has been described thus far does not differ in any essential manner from that shown and described in the earlier U.S. Pat. Nos. 4,296,570 and 5,410,842.

The present invention adds a pressure compensated, adjustable flow control valve 40 between the control line 12 and the reservoir 21. Specifically, one side of the flow control valve 40 is connected to the control line 12 at a point between the pump 10 and the counter balance valve 30. The other side of the flow control valve 40 is connected by a line 41 to the reservoir 21. In operation, when the pump 10 is pumping through the control line 12 to rotate the motor 11 in a direction that would tend to close the door to which the motor is connected, a portion of the flow is diverted by the flow control valve 40 to return to the reservoir 21 with the result that the motor 11 will rotate at a slower speed in closing the door. The flow control valve 40 does not effect the flow of hydraulic fluid between the pump 10 and the motor 11 through the control line 13 to rotate the motor 11 in a direction to open the door.

A brake 45 having a hydraulic actuator 46 is connected to the door mechanism in a known manner. The actuator 46 is spring biased to a position in which the brake is engaged. The brake is released by providing hydraulic fluid under pressure to the actuator 46. The actuator 46 is connected to a line 47 leading to a solenoid valve 48. A second line 51 leads from the line 47 to both of the control lines 12 and 13 through respective check valves 49 and 50. The normal position of the solenoid valve 48 connects the lines 47 and 51 to the line 41 leading to the reservoir 21. Thus, when the solenoid valve 48 is not actuated, the fluid flow from the pump 10 is diverted to the reservoir 21, the brake remains engaged, and the motor 11 will not turn to move the door. When the solenoid valve 48 is actuated, the connection of the lines 47 and 51 to the reservoir 21 is blocked. Any flow from the pump 10 in either direction to open or close the door will provide fluid under pressure to the brake actuator mechanism 46 thereby releasing the brake and allowing the motor 11 to move the door. The solenoid valve 48 is preferably a poppet style solenoid valve.

A hydraulic door operator circuit according to the present invention can use the flow control valve 40 without the brake operation provided by the brake 45 and the solenoid valve 48. Similarly, a hydraulic door operator circuit can use the brake 45 and solenoid valve 48 without the two-speed operation provided by the flow control valve 40.

We claim:

1. A door operator having a hydraulic system for opening and closing a door, comprising:
    a hydraulic pump for pumping fluid;
    a hydraulic fluid reservoir connected to the pump;
    a reversible hydraulic motor connected through hydraulic control lines with the pump to be driven thereby, the hydraulic control lines comprising a first line between a first side of the hydraulic pump and a corresponding side of the hydraulic motor and a second line between a second side of the hydraulic pump and a corresponding side of the hydraulic motor;
    a counter balance valve in each of the hydraulic control lines between the hydraulic pump and the hydraulic motor, the counter balance valves being normally closed to lock fluid in the hydraulic motor to block turning thereof;
    a pilot line extending between each hydraulic control line and the counter balance valve in the other hydraulic control line, whereby pump pressure in one control line opens the counter balance valve in the other control line; and
    a variable bypass valve connected to one of the control lines at a point between the pump and the counter balance valve to bypass to the reservoir a portion of flow from the pump to the motor when the pump output is connected to rotate the motor in a direction that will close the door to supply the motor with reduced hydraulic fluid in this direction with respect to an opposite direction so that the motor can close the door slower than it opens the door.

2. A door operator according to claim 1 wherein the bypass valve is a pressure compensated, adjustable flow control valve.

3. A door operator according to claim 1 together with a hydraulically released brake that normally prevents the door from moving, the brake being connected to both control lines so that flow from the pump through either control line will release the brake, and an actuatable valve for connecting the brake to the reservoir to engage and disengage the brake.

4. A door operator according to claim 3 wherein the actuatable valve is a solenoid actuated, poppet style valve that normally connects the brake to the reservoir.

5. The door operator according to claim 3 wherein the actuatable valve and the bypass valve are connected to the reservoir by a common line.

6. In a door operator having a hydraulic system for opening and closing the door including a reversible hydraulic motor connected to a pump through a pair of hydraulic control lines that are selectively connected to the output of the pump to drive the motor in one direction to open the door and in an opposite direction to close the door, a fluid reservoir connected to the pump, and a hydraulically releasable brake connected to the door, the improvement wherein:
    the brake is connected to each of the hydraulic lines, so that fluid flow from the pump to the motor in either line will actuate the brake to disengage the brake from the door; and
    a normally open solenoid valve is connected between the reservoir and the connection of the brake to the hydraulic lines so that when the solenoid valve is opened it diverts fluid from the hydraulic lines to the reservoir to maintain engagement of the brake and which is actuatable to close the connection from the hydraulic lines to the reservoir.

* * * * *